United States Patent [19]

Whaley

[11] Patent Number: 4,648,151
[45] Date of Patent: Mar. 10, 1987

[54] JAMB PLATE FOR DOOR CLOSER

[76] Inventor: Ernest P. Whaley, 6937 Arcola, Garden City, Mich. 48135

[21] Appl. No.: 737,322

[22] Filed: May 23, 1985

[51] Int. Cl.[4] .............................................. E05F 1/00
[52] U.S. Cl. .......................................... 16/71; 16/49; 16/DIG. 9; 16/DIG. 40; 403/199; 403/262
[58] Field of Search .................. 16/49, 71, 72, 78, 79, 16/80, DIG. 9, DIG. 10, DIG. 40, 51; 403/199, 262

[56] References Cited

U.S. PATENT DOCUMENTS

| 2,498,590 | 2/1950 | Straus | 403/199 X |
| 4,070,727 | 1/1978 | Kanou | 16/72 |
| 4,367,864 | 1/1983 | Eldeen | 403/262 X |
| 4,382,311 | 5/1983 | Watts | 16/72 X |
| 4,471,575 | 9/1984 | Stout | 16/80 X |

Primary Examiner—Fred Silverberg
Attorney, Agent, or Firm—Charles W. Chandler

[57] ABSTRACT

A jamb plate is mounted between the jamb bracket of a conventional door closer and the door jamb to prevent the door closer from tearing away the door jamb.

1 Claim, 3 Drawing Figures

JAMB PLATE FOR DOOR CLOSER

BACKGROUND OF THE INVENTION

This invention is related to door closers and more particularly to a plate mounted between the jamb bracket and the door jamb to prevent the jamb bracket from being yanked from the jamb when a high wind or other conditions cause the door to suddenly open.

Door openers are conventionally mounted between a storm door and a wooden door jamb to control the opening and closing of the door. One problem with conventional door closer jamb brackets is that a sudden high wind or other force tending to open the door often jerks the fasteners connecting the jamb bracket to the door jamb. The conventional approach is then to either relocate the jamb bracket or use longer screws which frequently also tear out more of the door jamb, damaging its appearance and reducing the effectiveness of the door closer.

SUMMARY OF THE INVENTION

The broad purpose of the present invention is to provide a jamb plate that is mounted between a jamb bracket and the door jamb to prevent the door closer from yanking the bracket from the door jamb.

The preferred embodiment of the invention, which will be described in greater detail, comprises an elongated metal plate having fastener-receiving openings adjacent its opposite ends. The midsection of the plate is off-set from its ends and has several openings accommodating the conventional spacing of most commercial door closer brackets. The plate is mounted on the door jamb and the jamb bracket mounted on the midsection of the plate.

The off-set midsection of the plate permits a nut to be mounted between the plate and the jamb for receiving a screw to connect the bracket to the plate. One or more longer wood screws are employed to connect the bracket directly to the jamb. The wood screws tend to depress the midsection toward the jamb, thereby slightly spreading the ends of the plate to increase the attachment between the screws connecting the plate to the jamb.

The preferred embodiment of the invention provides means for substantially increasing the force necessary to tear the fasteners from the jamb in response to the door being suddenly swung open.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
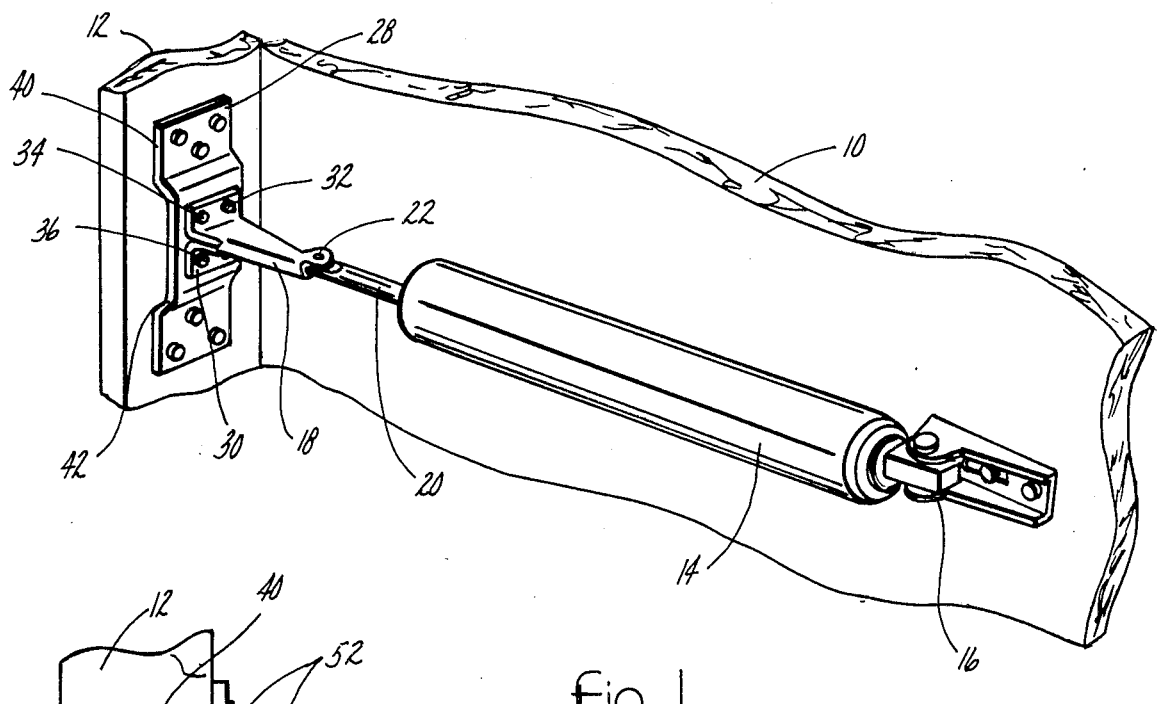
FIG. 1 is a perspective view illustrating the manner in which a conventional door closer is mounted between a door and a door jamb, employing a jamb plate embodying the invention.

Referring to the drawing, FIG. 1 illustrates a conventional storm door 10 mounted by hinge means (not shown) to wooden door jamb 12. A conventional spring-loaded, hydraulic door closer 14 is mounted between the door and the jamb to control the manner in which the door is opened and closed as is well known to those skilled in the art.

Bracket means 16 connect one end of the door closer to the door, and bracket 18 is connected to door closer piston rod 20 by pivot pin 22. Bracket 18 is conventional and is formed of a sheet metal with feet 28 and 30. The bracket feet have openings for receiving four threaded fasteners 32, 34, 36 and 38.

Figure 2:
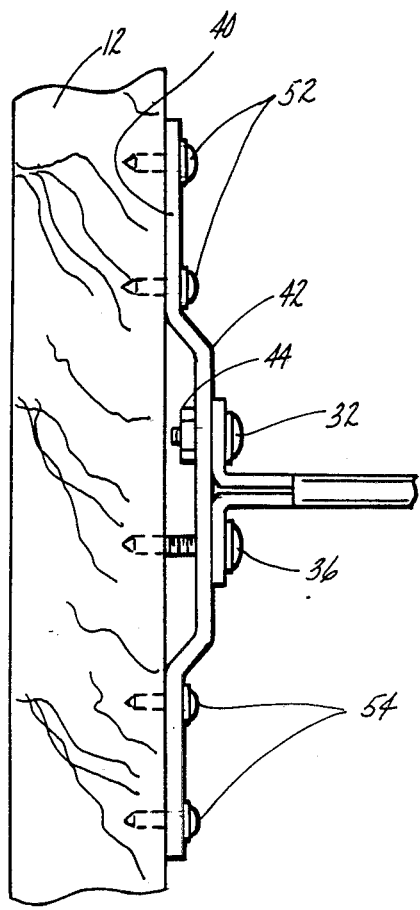
FIG. 2 is an elevational, partially sectional view illustrating the manner in which the jamb plate and jamb bracket are attached to the door jamb.
Figure 3:
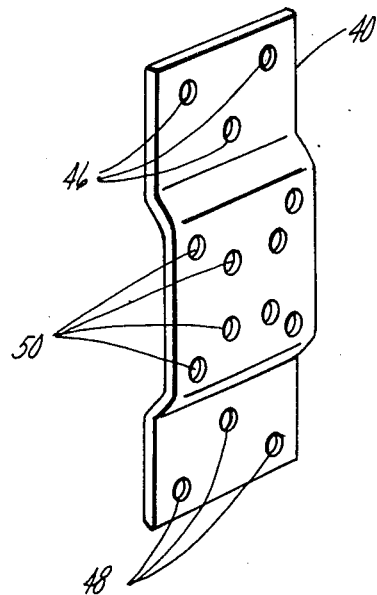
FIG. 3 is a perspective view of the preferred jamb plate.

Referring to FIGS. 2 and 3, jamb plate 40 is mounted between bracket 18 and jamb 12. The plate is a metal member, having a width slightly greater than that of the bracket and a length longer than the bracket. The plate has an off-set midsection 42 spaced from the jamb a distance of about three times the thickness of the plate, so that a fastener, such as nut 44, can be mounted between the plate and the jamb. The jamb plate has opening means 46 adjacent one end, and opening means 48 at the opposite end, on opposite sides of the off-set midsection. The midsection has several opening means 50 to accommodate the location of the fastener-receiving openings in most commercial door closer brackets.

In use, wood screw means 52 are received through opening means 46 to attach one end of the bracket plate to the door jamb while wood screw means 54 are received through opening means 48 to connect the opposite end of plate to the jamb. Fasteners 32, 34, 36 and 38 (not shown) are received through the openings in the bracket feet and the midsection of the jamb plate. Fasteners 32 and 34 are nut and bolt fasteners while fasteners 36 and 38 are large wood screws that screw into the wooden jamb.

Fasteners 36 and 38 move the midsection of the plate toward the jamb, thereby causing the opposite ends of the plate to slightly spread away from the midsection, and jamming fasteners 52 and 54 more firmly into the jamb thereby increasing its holding power.

Having described my invention, I claim:

1. For use with a door closer adapted to be mounted between a door and a door jamb, the combination comprising:

a jamb bracket, and means pivotally connecting same to the door closer, the jamb bracket having a base with a plurality of first fastener-receiving openings;

an elongated jamb plate having an offset midsection between a pair of substantially co-planar ends including a first end and a second end, the first end of the jamb plate having second fastener-receiving openings and the opposite, second end of the jamb plate having third fastener-receiving openings, the second and third fastener-receiving openings being spaced on opposite sides of the midsection of the jamb plate, the midsection of the jamb plate having a surface suited to seat the base of the jamb bracket thereon, the midsection of the jamb plate being offset with respect to the first and second jamb ends a sufficient distance to provide a space for receiving a fastener element between the midsection of the jamb plate and the door jamb, when the jamb plate ends are in abutment with the door jamb, the jamb plate midsection having fourth fastener-receiving openings;

first fastener means receivable through the first fastener-receiving openings in the jamb bracket and the fourth fastener-receiving openings in the midsection of the jamb plate for fastening the jamb bracket on the surface of the jamb plate midsection;

second fastener means receivable in the second fastener-receiving openings for fastening the first end of the jamb plate to the door jamb;

third fastener means receivable in the third fastener-receiving openings for fastening the second end of the jamb plate to the door jamb; and wherein said first fastener includes a threaded fastener receivable through at least one of the fastener-receiving openings in the jamb bracket and one of the fastener-receiving openings in the jamb plate midsection and in the door jamb to move the midsection of the jamb plate toward the door jamb and thereby cause the ends of the jamb plate to move longitudinally away from the midsection to increase the attachment between the second fastener means and the third fastener means and the ends of the jamb plate.

* * * * *